United States Patent [19]

McAuley et al.

[11] Patent Number: 5,187,799
[45] Date of Patent: Feb. 16, 1993

[54] ARITHMETIC-STACK PROCESSOR WHICH PRECALCULATES EXTERNAL STACK ADDRESS BEFORE NEEDED BY CPU FOR BUILDING HIGH LEVEL LANGUAGE EXECUTING COMPUTERS

[75] Inventors: Anthony McAuley, Morris Plain, N.J.; Rod Goodman, Altadena, Calif.

[73] Assignee: Calif. Institute of Technology, Pasadena, Calif.

[21] Appl. No.: 194,882

[22] Filed: May 17, 1988

[51] Int. Cl.⁵ .............................................. G06F 15/20
[52] U.S. Cl. ........................... 395/800; 364/232.8; 364/245.7; 364/247.7; 364/271.5; 364/DIG. 1; 395/650
[58] Field of Search .............................. 395/800, 650

[56] References Cited

U.S. PATENT DOCUMENTS

| | | | |
|---|---|---|---|
| 3,639,912 | 2/1972 | Campbell | 364/200 |
| 3,725,868 | 4/1973 | Malmer | 395/375 |
| 4,071,890 | 1/1978 | Pandeya | 364/200 |
| 4,084,224 | 4/1978 | Appell | 364/200 |
| 4,179,734 | 12/1979 | O'Leary | 364/200 |
| 4,231,087 | 10/1980 | Hunsberger | 364/200 |
| 4,367,524 | 1/1983 | Budde | 364/200 |
| 4,390,946 | 6/1983 | Lane | 364/200 |
| 4,393,468 | 7/1983 | New | 364/200 |
| 4,412,283 | 10/1983 | Mor | 364/200 |
| 4,414,624 | 11/1983 | Summer | 364/200 |
| 4,433,379 | 2/1984 | Schenk et al. | 364/200 |
| 4,449,201 | 5/1984 | Clark | 364/900 |
| 4,489,270 | 11/1984 | Quernomoen | 364/200 |
| 4,587,632 | 5/1986 | Ditzel | 364/736 |
| 4,600,986 | 7/1986 | Scheaneman | 364/200 |
| 4,620,275 | 10/1986 | Wallach et al. | 364/200 |
| 4,736,317 | 4/1988 | Hu | 364/200 |
| 4,745,544 | 5/1988 | Renner | 364/200 |
| 4,761,733 | 8/1988 | McCrucklin | 364/200 |
| 4,769,771 | 9/1988 | Lippmann | 364/200 |
| 4,791,550 | 12/1988 | Stevenson | 364/200 |
| 4,792,891 | 12/1988 | Baba | 364/200 |
| 4,821,228 | 4/1989 | Wickes | 364/900 |
| 4,878,174 | 10/1989 | Watkins | 364/200 |
| 5,055,015 | 10/1991 | Baldwin | 395/500 |

*Primary Examiner*—Thomas C. Lee
*Assistant Examiner*—Eric Coleman
*Attorney, Agent, or Firm*—Robert M. Wallace

[57] ABSTRACT

This is a 32-bit combined arithmetic unit and stack processor (designated as the ASP chip) designed to be a simple, flexible, yet powerful building block for a high level language computer. The ASP is a 3-micron CMOS chip which has run high level programs at 12.5 MHz. When combined with the right hardware and compiler, it will run procedural language programs efficiently. It requires extra hardware to build a complete system, so it is to be mainly where speed is critical; but, employs greatly simplified hardware and software designs. A basic ASP combines arithmetic and stack manipulation functions and is capable of performing 227 different instructions to implement the high level language. A minimum of two ASPs are required to construct a stack-oriented high level language computer.

14 Claims, 7 Drawing Sheets

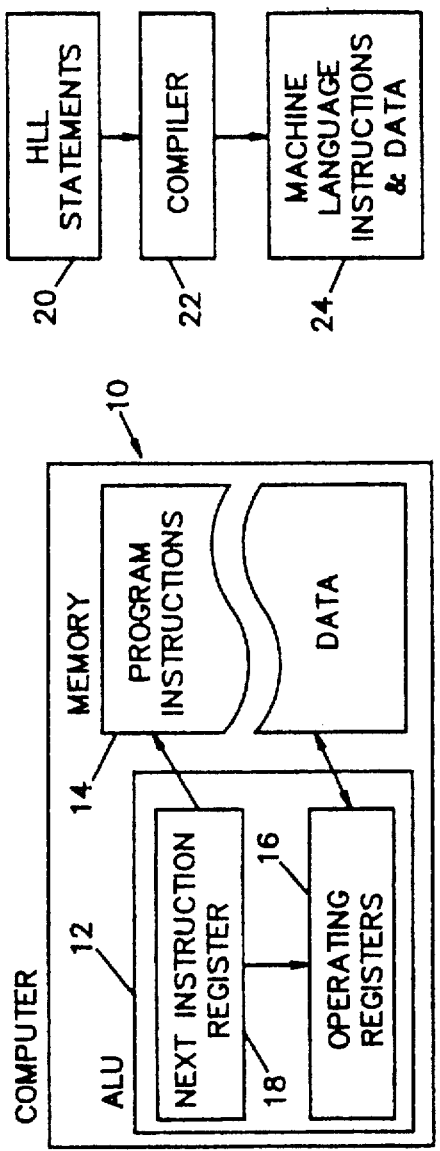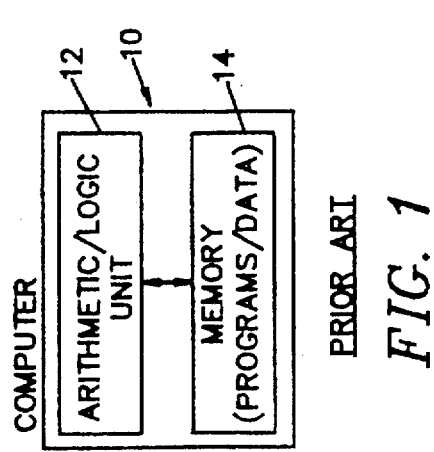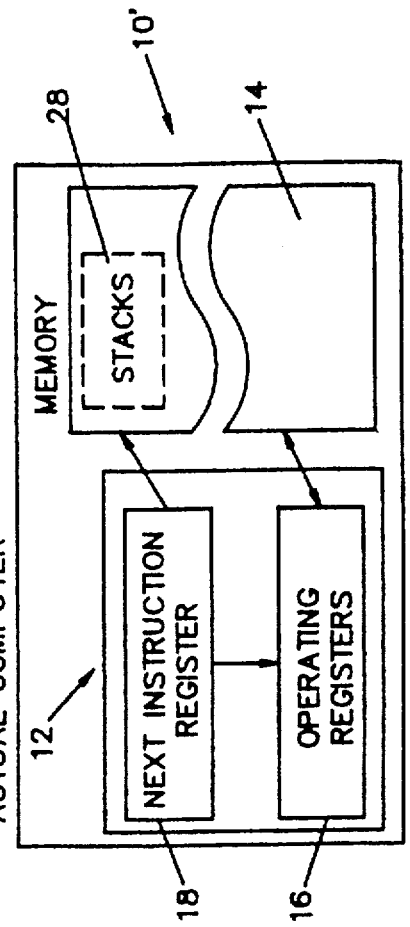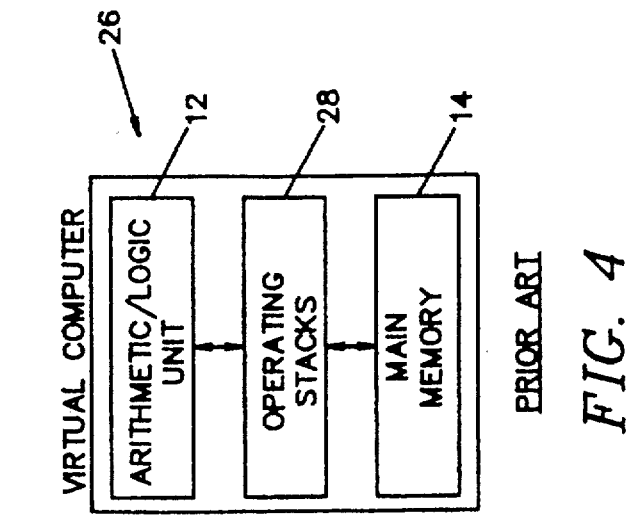

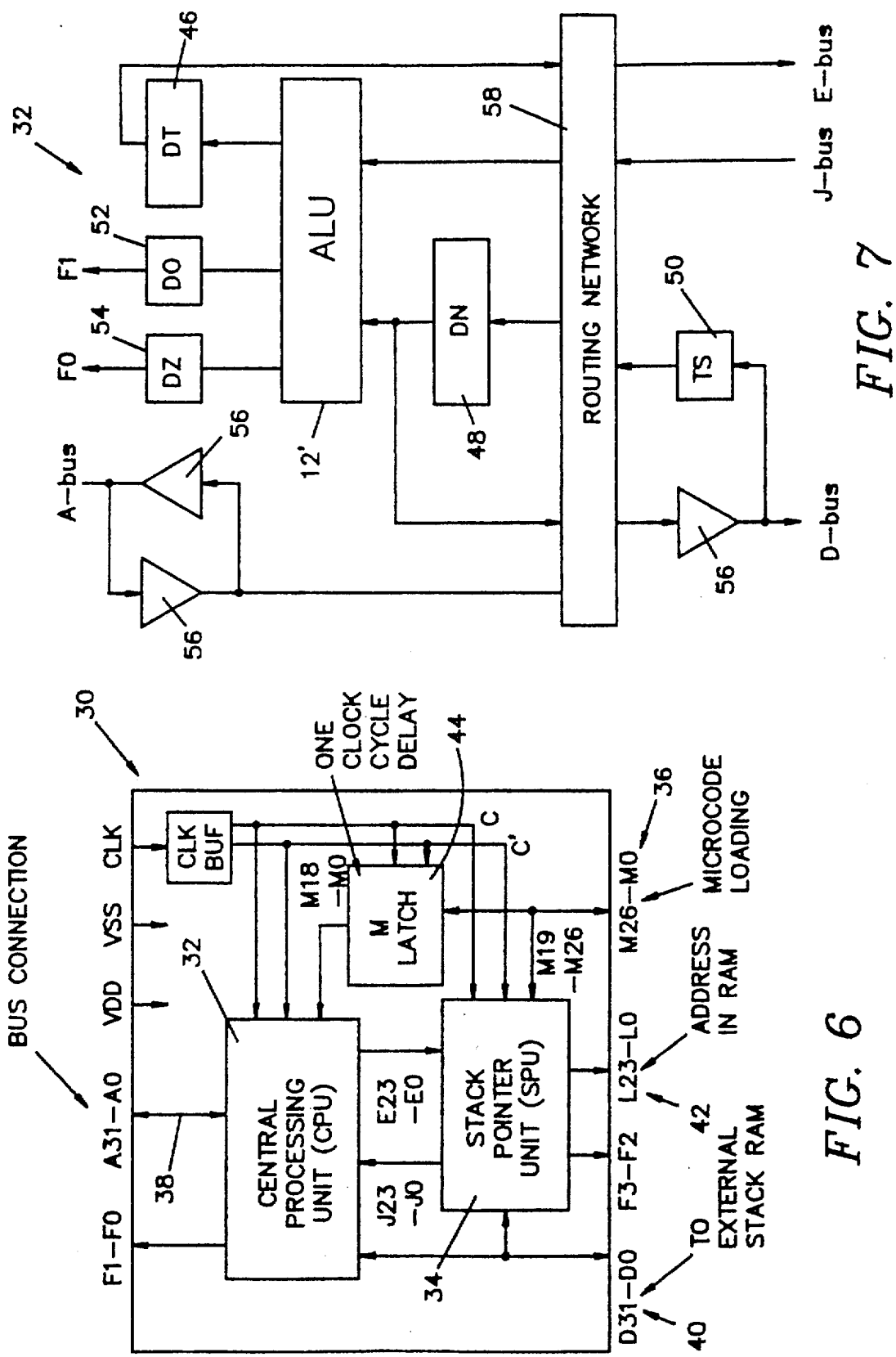

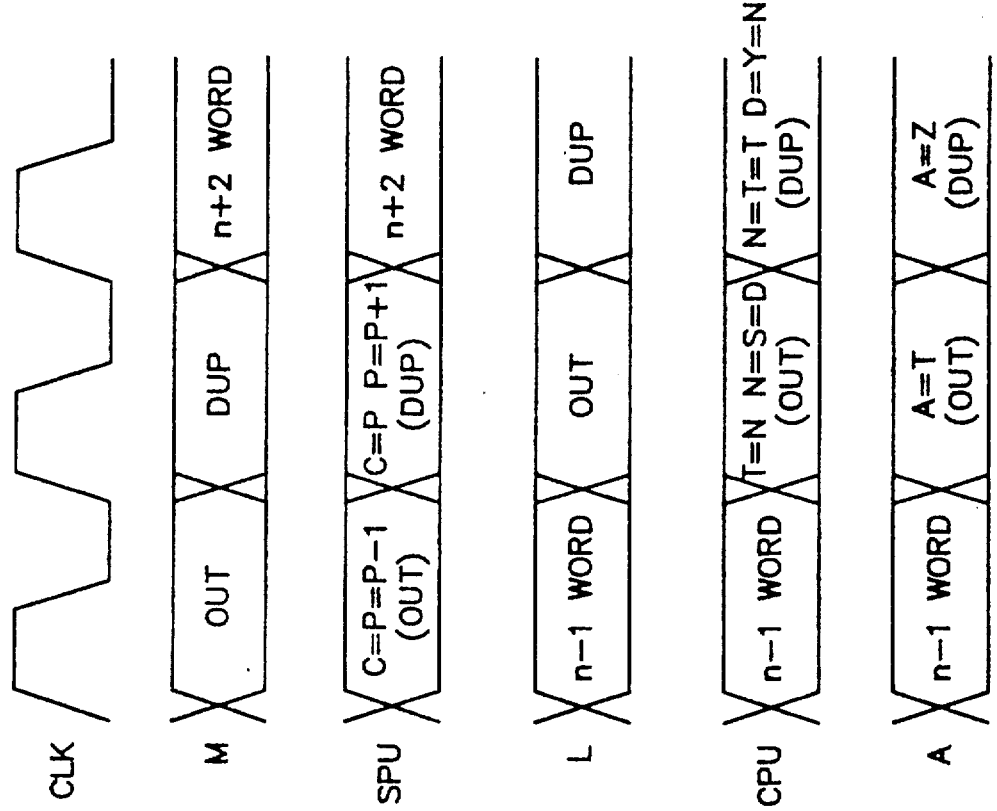

ARITHMETIC-STACK PROCESSOR WHICH PRECALCULATES EXTERNAL STACK ADDRESS BEFORE NEEDED BY CPU FOR BUILDING HIGH LEVEL LANGUAGE EXECUTING COMPUTERS

BACKGROUND OF THE INVENTION

The present invention relates to digital computers for processing high level languages and, more particularly, to a combined Arithmetic Stack Processor (ASP) for use in the building of high level language computers comprising, a microprogrammable Central Processing Unit (CPU) having a plurality of code input pin for sequentially loading microcode to be executed by the CPU, a plurality of input/output pins for acting as a port for external data transfers to and from the CPU, a plurality of RAM pins for reading from and writing to an external stack random access memory (RAM); a Stack Pointer Unit (SPU) having a plurality of RAM address pins for designating addresses of the external stack RAM to be written into and read from by the CPU and a plurality of stack pointer registers for containing stack pointers to locations in the external stack RAM; delay logic internally passing microcode to the SPU for thus causing the SPU to calculate from the microcode a sequence of next addresses in the external stack RAM one clock cycle before the CPU needs to read or write the data corresponding to each the next address; and, a clock buffer for receiving a clock signal at an input thereof and for transmitting the clock signal to the CPU, the SPU and the delay logic.

The typical system designer, in trying to solve a particular problem, uses prior knowledge of algorithm complexities to find the "best" algorithm. He then translates this into a high level language (HLL). When performance is critical, however, a standard general purpose computer may be too inefficient. In those cases, the system designer can either try to write part of the code in machine language or try to find a computer that can run the HLL program faster. It is with the latter approach that this invention is concerned.

The problem can be understood better with a brief look at the evolution of computers and their relationship to high level languages. An early prior art computer is shown in simplified block diagram form in FIG. 1 where it is generally indicated as 10. The computer 10 included an arithmetic and logic unit (ALU) 12 interfacing with volatile memory 14 containing the programs and data employed to cause the computer 10 to do useful work. The programs which were executed comprised a sequence of machine language instructions. As depicted in the drawing of FIG. 2, the ALU 12 contained a number of operating registers 16 and a next instruction register 18 which pointed to the location in the memory 14 of the next machine language instruction to be executed. The instructions themselves were basic manipulation and decision instructions whereby, for example, an operating register could be loaded with the contents of a location in the data portion of the memory 14. Programming in machine language meant programming in binary numbers. Such a process was difficult and prone to the introduction of errors (i.e. "bugs") into the program's instruction sequence.

Because of these problems, interpretive loaders and assemblers were developed very early in the evolution of computers and their support features. These programs allowed new programs to be created in symbolic alphanumeric representations of the machine language instructions. Instead of working in binary numbers, the programmer could use English language type statements which were then translated by the support software into the binary number sequences representing the machine language instructions loaded into and executed by the computer itself. While this was an improvement, the programming was still on a machine instruction capability level. For example, to see if a particular value was equal to 4, the location in memory containing the value had to be loaded into a register by one instruction, a 4 subtracted therefrom by a second instruction, and then the next instruction register modified by a decision instruction (i.e. a conditional branch in the instruction sequence) based on whether the contents of the register was equal to zero following the subtraction. Moreover, the problem of errors and bugs in the programming process remained.

To resolve the errors situation to a great extent and make programming easier overall, so-called "high level languages" (HLLs) were developed. The first, such as FORTRAN (for FORmula TRANslator), were primarily directed at performing complex mathematical processes since that was the primary use of computers in their infancy. Thus, as symbolized by the simplified diagram of FIG. 3, a programmer could input a HLL statement 20 such as B=C+D+E+F into the compiler 22 and the compiler would generate the necessary sequence of machine language instructions 24 to load a register with the contents of the memory location assigned to the symbolic label "C", add the contents of location "D", then "E", then "F", and finally store the results in location "B".

As can be appreciated, the early compilers for the high level languages had to be individually written for each new computer. This was because each new computer had different operating characteristics and machine language instructions which it executed. Such rewriting of compilers was a major undertaking consuming much time and consuming large sums of development funds as well. With the introduction of more compilers for the various specialized uses for which computers were being employed, the compiler problem got out of hand. The same was true for other types of large support programs. Thus, the concept of "portable" programs was introduced—including portable compilers. In this approach, the compiler performs its functions through generalized instructions which are then further implemented by a translation into the specific machine language instructions for the computer in question. A new translator is easily implementable, relatively speaking.

In addition to the changes in the approach to constructing compilers to achieve portability of the coding to new computers, the computers themselves went through an architectural revolution. The totally unique mainframe computers implemented in vacuum tubes and then discrete transistors gave way to minicomputers and then microcomputers implemented on a single printed circuit board as a number of integrated circuits that could, literally, fit on the desk top. In microcomputers, the instructions performed by the computer are not hardwired into the logic of the arithmetic and control unit 12 as in the early computers discussed briefly above. They are defined by microinstructions contained in a read only memory. The performance of the computer can be redefined by simply redefining the microcode. While this makes for flexibility, it also adds layers of time access to the execution sequence; that is, everything in the computer is done under the control of the clock frequency and, while the clock frequencies have become higher and higher in order to increase computer throughput, there is still a price to pay in time for the flexibility that this newer approach to computer designs provided. All this is to say that when a high level language is implemented for portability by writing it in a high level language which, in turn, is compiled by a compiler written in a high level language operating on a computer designed for general flexibility, the resultant object code that embodies the ultimate high level language statements of a programmer programming applications programs may perform in a less than optimum manner.

In the early days of high level languages, programmers familiar with machine language coding would do a first pass at a major programming task using a high level language to produce virtually bug-free programs in a short time. Critical paths that needed to execute as quickly as possible were then reprogrammed in machine language. The result was a bug-free system with a good level of performance capability in the least amount of time. Unfortunately, this approach is generally no longer employed as the number of programmers capable in machine language is practically nil. As a result, the approach is usually one of "what you see is what you get." The final coding running in a computer as produced from high level language inputs is, therefore, generally far less then optimum.

A computer engineer trying to help a system designer to solve his problems, is faced with a myriad of choices. The easier and cheaper solution is to use one of the standard microprocessors, such as the Motorola 68020. If this does not meet the speed requirements, however, he must accept the harder and more expensive task of designing from more basic elements; such as the Advanced Micro Devices 29300 bit-sliced elements, standard chips, or design an applications-specific computer chip.

The inventors' motivation herein was to provide the art with a basic hardware element that would simplify the design of a wide variety of language-directed computer architectures; that is, computers intended to operate from high level language inputs. With such a basic element, the designer could follow an applications-driven approach; starting with a language of his choice and then writing the program. Only then would he need to be concerned with profiling the program to optimize his compiler and decide whether any hardware modification is desirable.

SUMMARY

The objectives of the inventors as stated above have been achieved by the combined Arithmetic Stack Processor (ASP) for use in the building of high level language computers of the present invention comprising, a microprogrammable Central Processing Unit (CPU) having a plurality of code input pins for sequentially loading microcode to be executed by the CPU, a plurality of input/output pins for acting as a port for external data transfers to and from the CPU, a plurality of RAM pins for reading from and writing to an external stack random access memory (RAM); a Stack Pointer Unit (SPU) having a plurality of RAM address pins for designating addresses of the external stack RAM to be written into and read from by the CPU and a plurality of stack pointer registers for containing stack pointers to locations in the external stack RAM; delay logic internally passing microcode to the CPU for thus allowing the SPU to calculate from the microcode a sequence of next addresses in the external stack RAM one clock cycle before the CPU needs to read or write the data corresponding to each the next address; and, a clock buffer for receiving a clock signal at an input thereof and for transmitting the clock signal to the CPU, the SPU and the delay logic.

In the preferred embodiment, the delay logic comprises latches for receiving microcode simultaneously with the SPU and for delaying the microcode one cycle of the clock signal before it reaches the CPU and an adder for allowing the SPU to add the contents from one of its stack pointers to any offset required and latch the result onto an L-bus latch connected to the plurality of RAM address pins during the one clock cycle whereby the CPU is allowed to read or write from the external stack RAM with the associated address therefor already waiting on the L-bus latch.

Further in the preferred embodiment, the CPU comprises, an arithmetic and logic unit (ALU); a pair of top two stack position registers (DT and DN); a transparent latch (TS); a pair of one-bit flag registers (DO and DZ); a plurality of tri-state buffers; and, a multiplexer for interconnecting the foregoing components and for connecting the foregoing components to the code input pins and the input/output pins.

Also in the preferred embodiment, the SPU comprises, a pair of stack pointer registers (DP and DQ); a pair of stack limit registers (TT and TB); a pair of buffers (DL and DJ); a pair of flag registers (DT and DB); a pair of adders (AL and AK); a pair of comparitors acting as underflow and overflow detectors, respectively; and, a multiplexer for interconnecting the foregoing components and for connecting the foregoing components to the RAM address pins and the CPU.

DESCRIPTION OF THE DRAWINGS

FIG. 1 is a simplified block diagram of a basic prior art computer.

FIG. 2 is a further breakdown block diagram of the computer of FIG. 1.

FIG. 3 is a block diagram of a prior art approach to programming in a high level language.

FIG. 4 is a simplified block diagram in the manner of FIG. 1 of a virtual computer as employed in the prior art for designing the operating characteristics of a high level language.

FIG. 5 is a further breakdown block diagram in the manner of FIG. 2 showing the actual implementation in the prior art to execute programs designed around the virtual computer of FIG. 4.

FIG. 6 is a functional block diagram of the arithmetic/stack processor (ASP) unit of the present invention.

FIG. 7 is a block diagram of the central processing unit (CPU) portion of the ASP.

FIG. 10 is a diagram showing the fields of the instruction format in the ASP built and tested by the applicants.

FIG. 15 is a diagram showing the ASP timing.

DESCRIPTION OF THE PREFERRED EMBODIMENT

Section 1—Introduction

Figures 8, 9:
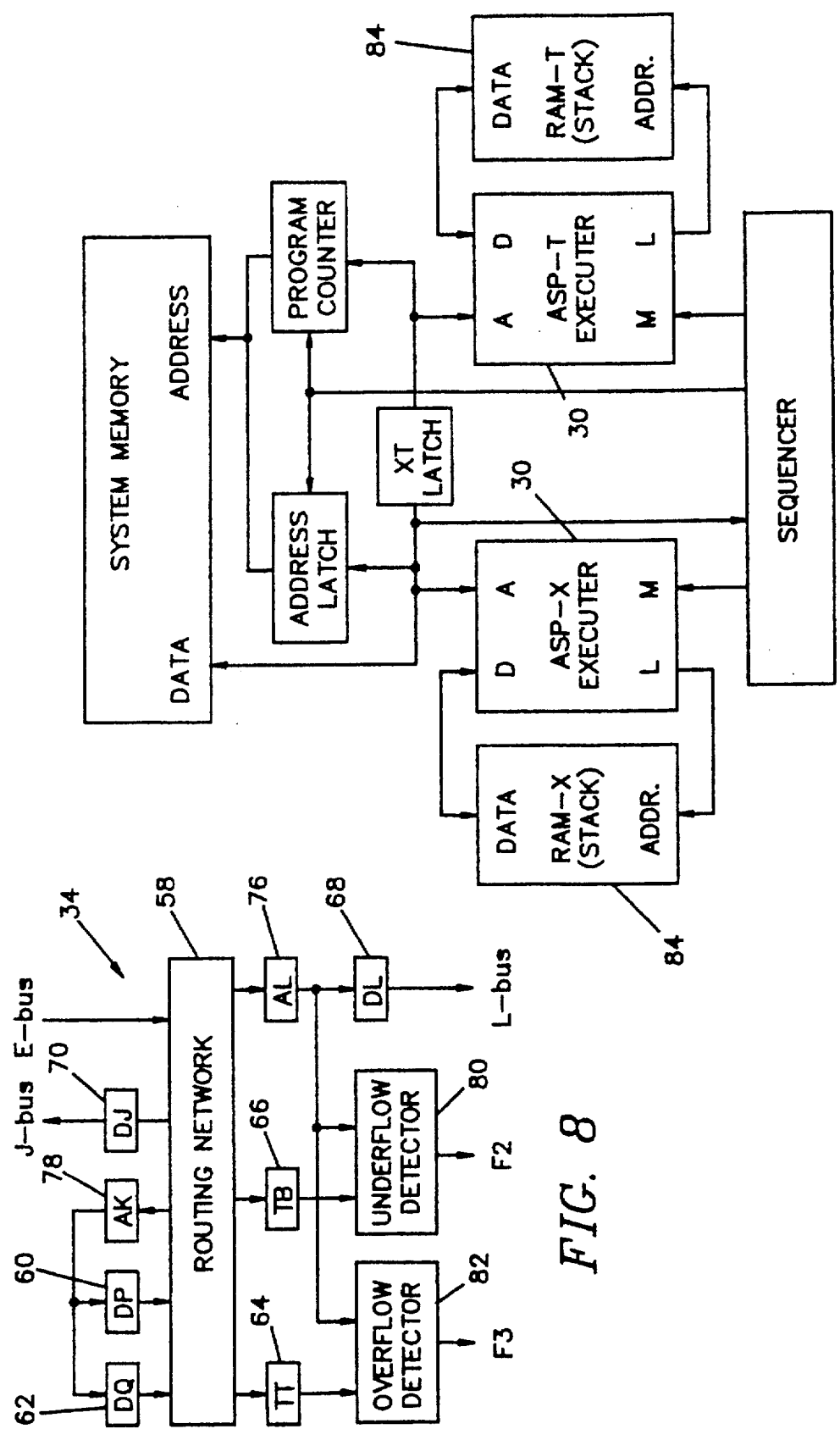
FIG. 8 is a block diagram of the stack pointer unit (SPU) portion of the ASP.
FIG. 9 is a block diagram of a simple virtual stack machine as actually implemented and tested with the ASP of the present invention.

It is important to note from the start that the chip of the present invention is far below the sophistication and complexity of 32-bit microprocessors as are well known in the art. The present invention can be characterized as, basically, a naked stack processor. The primary goal of the inventors was to provide a piece of hardware that would allow system designers to build a variety of HLL computers, customized to their needs, quickly and efficiently.

It is clear and well known in the art that there must be some trade-off between simplicity, flexibility and power when designing a computer system. In Section 2 herein, three broad approaches to this problem are described very briefly. Then, in Section 3, what is meant by a HLL computer, and the potential benefits to be achieved from such a machine, are described. In Section 4, the virtual stack machine, which is the basis of this approach, is described. Sections 5, 6 and 7 go into the detail of the hardware the inventors have built and tested, which they call the "ASP". It contains elements of all three approaches discussed in Section 2; but, offers a trade-off which, for certain applications, is better than any. The critical importance of this malleability to applications-driven solutions is discussed in Section 8.

In Section 9, how to use the ASP to build a machine dedicated to "C", with the aid of additional hardware and software, is shown. It will become clear that the architecture is optimized for procedural languages; so, in Section 10, architectural changes to allow the ASP to run functional, object-oriented and DSP type languages efficiently are briefly discussed.

Section 2—Three Classes of Computers

In this section, three classes of computer architecture are quickly reviewed, i.e. the RISC, the CISC and the BISC (the inventors' own acronym). Though the dividing line is somewhat fuzzy; this characterization enables the differentiation of the approach to building a computer according to the present invention from existing methods.

Recently, the most popular approach to computer design has been the Reduced Instruction Set Computer (RISC). This name covers a broad spectrum of architectures; but, all have a small number of simple instructions tailored towards the most used primitives of a HLL, each executing in a single clock cycle. One approach to RISC architecture is to have a large number of registers and a fast instruction pipeline. The instructions, though directed towards a HLL, are normally of fairly low level. An example of this approach is the University of California at Berkeley RISC II machine. A second approach to RISC is to have virtually no internal registers, making context switching much faster. The Novix NC4000 is an example of this approach which has just forty primitives. The Novix NC4000 is the closest cousin, so to speak, of the present invention in that it is a microprocessor intended to operate as a stack processing computer primarily for the execution of the FORTH language. It employs internal pointers to off-chip stacks and memory, however, and, therefore, coupled with the limitation of forty primitives, it is of limited capability, speed, and flexibility when it comes to actual operation. This will be returned to shortly.

The second broad classification is the Complex Instruction Set Computer (CISC). CISCs try to migrate many of the HLL constructs directly into the primitive machine instruction. The microcode, equivalent to a RISC instruction, is hidden in the on-chip sequencer. This allows a reduction in the number of instructions needed to perform a particular task, at the cost of some flexibility. A good example of a CISC is the Motorola 68020.

The final classification is what the inventors herein have chosen to identify as the Bit-Sliced Computer (BISC). BISCs provide very flexible building blocks, such as an Arithmetic and Logic Unit (ALU), sequencer, and multiplier, for high performance applications. Despite the programming problems associated with low level, complex micro-instructions, they remain popular because they can out-perform standard microprocessors. A good example of a BISC is the Advanced Micro Devices 29300 family. Also included in this class are computers built from standard TTL or custom/semicustom chips.

Even though RISC and CISC architectures continue to improve, and indeed be combined, they are often too inefficient for high-performance applications. While the throughput achievable with the BISC approach is potentially much better, it is expensive and takes even experienced designers a long time to complete. What the inventors herein identified as being required and lacking in the art is a combination of this power and flexibility, together with simplicity in both hardware and software.

Section 3—High Level Language Computers

There is a well-documented conceptual gap between the users of computers (who typically think in terms of high level language) and the computer hardware, which is programmed in machine code. The design of a HLL computer to bridge this "semantic gap" is certainly appealing. It would allow programmers to be more effective, since it would be easier to see how the program actually runs in the hardware. A true HLL computer would also facilitate easier software debugging, greater reliability, and an opportunity to customize the hardware to the problem. The RISC and CISC machines represent two ways of trying to approach the problem. In the remainder of this specification the description of a new, bit-sliced approach to the design of a HLL computer according to the present invention will be included.

Section 4—The Virtual Stack Machine

When a HLL is compiled to run on a microprocessor, there is normally an intermediate language (IL) generated between the source code generated by the programmer (e.g. "C") and the machine language (e.g. 68020 machine code) which is actually loaded and run by the computer to perform the steps of the program. As depicted in FIG. 4, the designers of high level languages typically design the language and its manner of operation around a virtual computer 26; that is, an imaginary computer set up to perform in the desired manner.

The IL is most efficient when it is based on a Reverse Polish machine; that is, on a virtual stack machine wherein, as depicted in FIG. 4, the ALU 12 operates on stacks 28 which are loaded out of the main memory 14. In such case, the operators occur on the stacks in the same order in which they are employed. As a result, they are quicker and easier to run. The basic building blocks of a "typical" virtual stack machine are: an ALU, an arithmetic stack, a return stack, an Instruction Fetch Unit (IFU), a microcode-sequencer and some data and instruction memory. Unfortunately, the virtual stack machine around which the HLL is designed never actually exists in its entirety in the prior art. Instead, it is typically implemented as in the computer 10' of FIG. 5; that is, the stacks 28 only exist as part of the memory 14 and the normal overhead of moving operators, data, etc. from memory into the stacks and from there into the ALU 12 for execution is still present. The Novix NC4000, which was mentioned above, is conceptually the closest to the ASP of the present invention; but, there are some important and dramatic differences. The ASP has no internal microcode or decoding, i.e. microcode directly controls the circuit elements as in a bit sliced computer. The ASP pipeline delay between the CPU and the SPU minimizes external RAM speed requirements. The ASP instructions are completely general; and, the internal data paths are from any element to any other element. The NOVIX, on the other hand, has a fixed set of instructions, most of which are FORTH words, and cannot be added to. The ASP has two stack pointers, which can both have a large variety of offsets, including the top of stack (TOS) (very useful for a fast PICK instruction). The use of two ASP's per system allows more powerful sequencing operation—including the ability to do subroutine calls with *zero* overhead. Finally, the ASP has 32 bits vs. the NOVIX's 16 bits for data (stack and system); and, 24 bits for stack address vs. 8 bits for the NOVIX.

The function of the ALU and arithmetic stack are the execution of the language primitives. The IFU and return stack have to get the address of the next instruction and perform the stack frame management of the subroutine calls. The exact function and interaction between the ALU and IFU blocks will depend on the language being implemented; but, two important observations can be made at this stage which, when realized by the inventors herein, formed the basis or foundation of the present invention. First, the ALU and IFU, though functionally very different, actually require very similar hardware. Second, they can operate fairly independently; so, for example, the IFU could work concurrently or even asynchronously with the ALU—except when the two need to communicate. It was determined by the inventors that it was possible to put all of the above functions onto a single chip; but, with limitations on the size of stack and general lack of flexibility. In order to fulfill the goal of flexibility, in designing the chip which incorporated the present invention in its tested embodiment, the inventors mapped only the critical, "lowest common denominator", hardware elements onto a fast custom VLSI chip. This approach gives greater freedom for applications-driven solutions. The chip was designed to act as the core of both the ALU and IFU. Because the common functions are an arithmetic unit and a stack, the inventors dubbed this device the Arithmetic Stack Processor, or "ASP" for short.

Section 5—The Arithmetic Stack Processor

FIG. 6 shows a block diagram of the ASP, while Table 1 describes the function of the external pins of the VLSI built and tested embodiment thereof mentioned previously. The 32-bit Arithmetic Stack Processor (ASP) 30 of the present invention can be split logically into a Central Processing Unit (CPU) 32 and a Stack Pointer Unit (SPU) 34. These represent the inventors' identification of the two key elements necessary to running a HLL.

TABLE 1

| ASP PIN DESCRIPTIONS | |
|---|---|
| SIGNAL | DESCRIPTION |
| M26-M0 | Microcode input bus |
| A31-A0 | Bidirectional, tri-state system bus (inverted signals) |
| D31-D0 | Bidirectional, tri-state stack RAM data bus (inverted signals) |
| L23-L0 | Stack RAM address bus |
| F3 | Stack underflow |
| F2 | Stack overflow |
| F1 | ALU numeric overflow |
| F0 | ALU zero detect |
| CLK | System clock input |
| VDD(2) | Power input, 5 volts |
| VSS(2) | Power input, 0 volts (GND) |

The ASP 30 is a flexible, high speed 32-bit microprogrammable device. It can perform $2^{27}$ different operations (definitely not a RISC!), a high proportion of which could be employed as primitives to optimize different applications. Microcode is loaded via pins M26-M0, generally indiated as 36, with the A31-A0 bus 38 acting as the port for external data transfers. The external "stack RAM" (not shown in this figure) is read or written via pins D31-D0, generally indicated as 40, with the address supplied on pins L23-L0, generally indicated as 42; both of which are invisible to the rest of the system.

Simplicity, flexibility and power are the three keys to the ASP 30 of the present invention. The simplicity is in the architecture, which consists of just a few registers, multiplexers and adders directly driven by microcode. The flexibility is in its ability to perform $2^{27}$ different microinstructions. The power comes from both the high level of the microinstructions, which are much higher than standard microprocessor machine code, and the speed at which it can execute them.

There is one level of pipelining on the chip, used in order to minimize the speed requirement of external RAM. The SPU 34 calculates the address one cycle before the CPU 32 needs to read or write the corresponding data. To achieve this, the microcode goes directly into the SPU 34, allowing it to add the contents from one of its stack pointers to any offset required, and latch the result onto an L-bus latch (not shown). The M-latch 44 (see FIG. 6) delays the microcode one clock cycle before it reaches the CPU 32, allowing it to read or write from the external RAM with the address already waiting on the L-bus.

Figure 11:
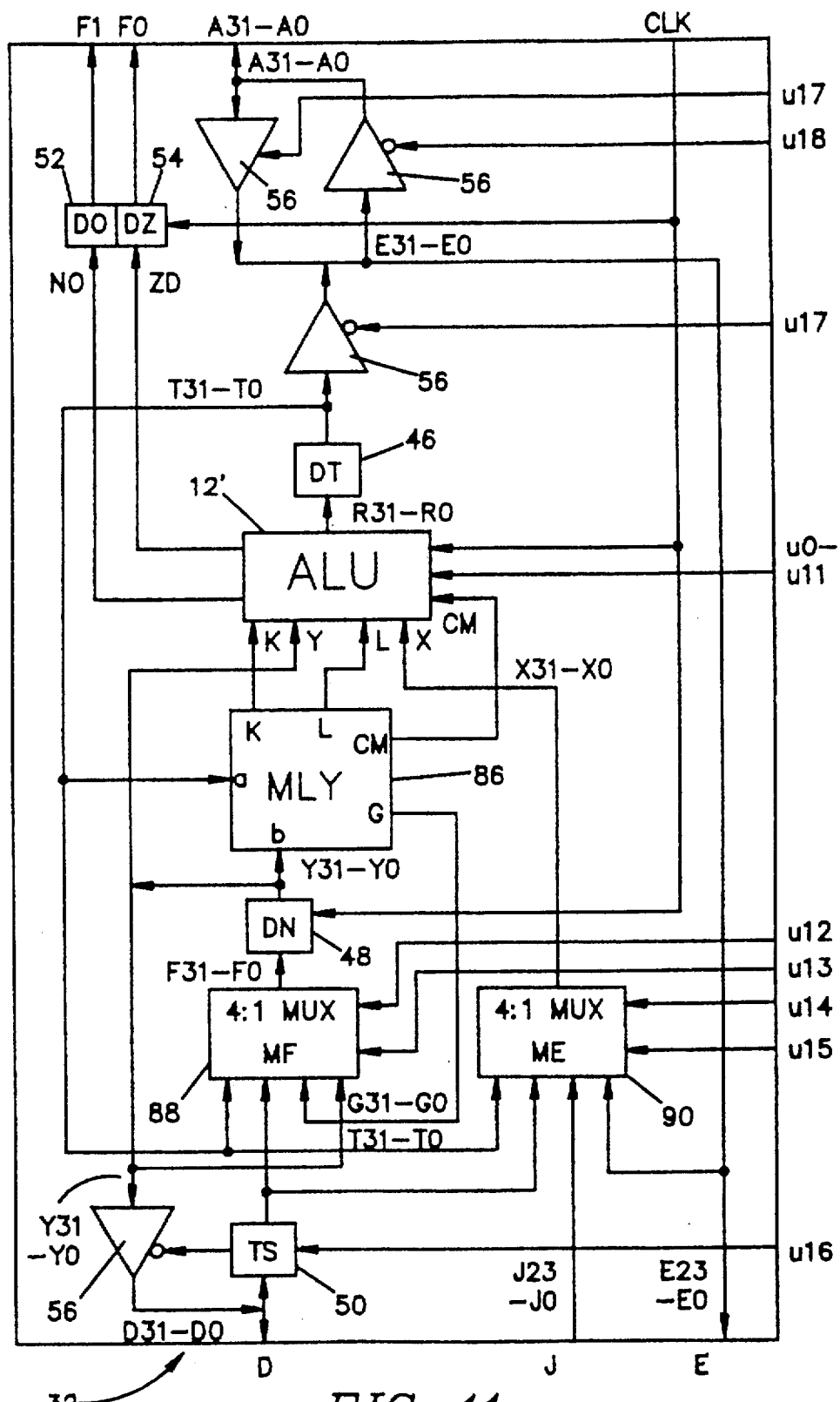
FIG. 11 is detailed block diagram of the CPU portion of the built and tested ASP.
Figure 13:
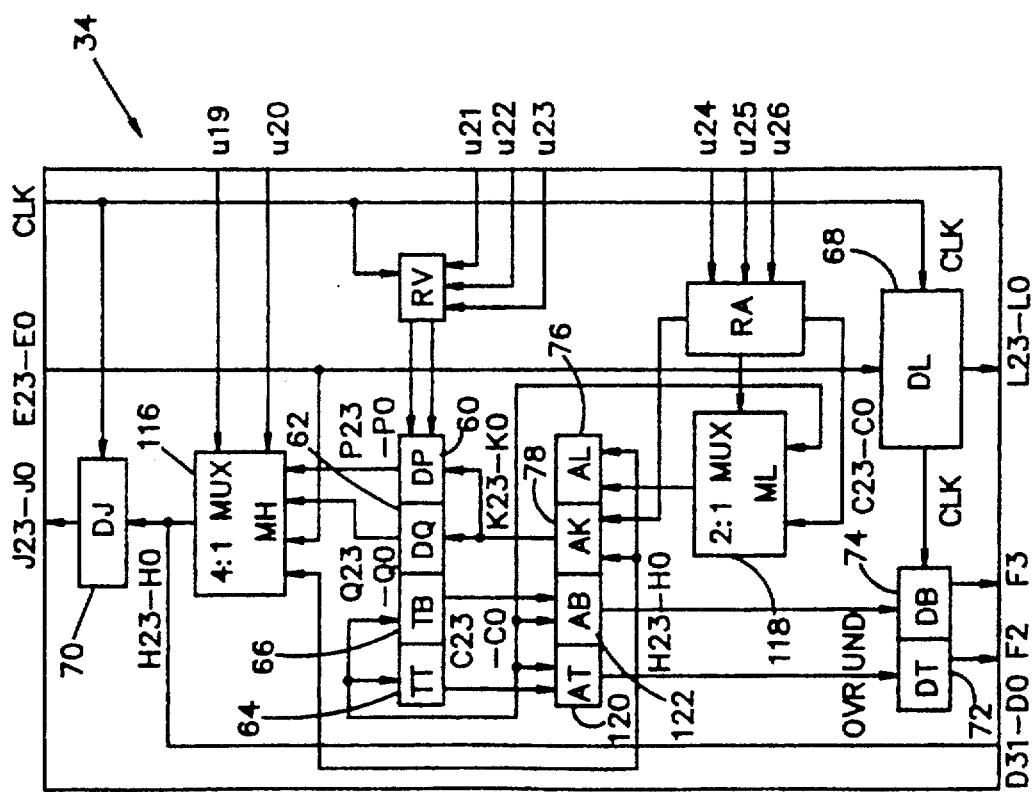
FIG. 13 is detailed block diagram of the SPU portion of the built and tested ASP.

FIGS. 7 and 8 are simplified block diagrams of the SPU 34 and CPU 32, respectively, while FIGS. 11 and 13 show them in greater detail. Most blocks have a separate pathway to any other block; though for simplicity this is just labeled as a routing network in the figures. The CPU 32, shown in FIGS. 7 and 11, consists of an ALU 12', the top two stack registers (DT 46 and DN 48), a transparent latch (TS) 50, two one-bit flag registers (DO 52 and DZ 54), tri-state buffers 56 (indicated by the triangles) and appropriate multiplexers (shown for simplicity as the routing network 58). The ALU 12' is very powerful and flexible, and contains many unusual capabilities to enable most internal language primitives to run in one clock cycle (see Section 7). The flags F1 and F0, respectively, tell an external sequencer (not shown) whether the ALU 12' result was zero or if an arithmetic overflow has occurred. The ALU 12' normally takes its operands from DT 46 and DN 48, but can also take them from the SPU 34, the D-bus SS (via TS 50) or the A-bus. Its operation is controlled by the 19 bits of the microcode in the M-latch 44.

The SPU 34, shown in FIGS. 8 and 11, has two stack pointer registers (DP 60 and DQ 62), stack limit registers (TT 64 and TB 66), buffers (DL 68 and DJ 70), flag registers (DT 72 and DB 74), adders (AL 76 and AK 78), comparitors (underflow and overflow detectors 80 and 82, respectively) and appropriate multiplexers (again indicated as a routing network 58 for simplicity). Its operation is controlled by the eight microcode lines M26-M19. The main function of the SPU 34 is to generate the new stack address and put it into AL 76. This allows the external RAM to simulate a stack. Normally, though there is, in fact, much flexibility, it takes DP 60 as the base address and adds to it some bits of the microcode using AL 76. At the same time, it updates DP 60 (normally, equal to the old DP plus some microcode bits added together by AK 78). F3 and F2 indicate whether the address has overflowed or underflowed the limits set in TT 64 and TB 66, respectively.

Section 6—The Custom CMOS Chip Design

The ASP 30 as built and tested by the inventors herein was fabricated in 3-micron, double level metal, CMOS, with less than 25,000 transistors on a 6.8-mm$^2$ chip and packaged in a 124 pin grid array. By using custom design, as opposed to gate arrays for example, the inventors were able to get the most out of the silicon; yet, because of the simplicity of the architecture, it was designed, laid out and fully tested in under a year. It is fully static, so requires no minimum clock frequency or refresh, and consumes less than a watt at 12.5 MHz. It has a single external clock line, and all data changes on the falling edge. The pins can read or write from either CMOS or TTL devices and drive up to 20 pF. The working ASP 30 chip was designed on a SUN 3/160C computer running a HILO-3 simulator and MAGIC layout editor. Both pieces of software proved to be both powerful and flexible and well-suited to low complexity custom layout. Testing was done with the inventors' own hardware set-up, with the chip connected through ports to a VME bus. The test program was written in FORTH on a standard computer talking to the VME bus.

For speed, the three adders and two comparitors employed were designed with a full carry-look-ahead. It is anticipated by the inventors that the number of transistors on the ASP 30 as built and tested could be reduced below 20K by replacing the designs used for the implementation described by simpler Manchester carry chains as are well known in the art. Other well known simplifications, if implemented, could, undoubtedly, reduce the transistor count to around 10K transistors without significant performance degradation, making the ASP 30 chip of the present invention an ideal candidate for GaAs; however, some re-design to exploit GaAs's strengths and weaknesses would probably be required, such as putting some form of on-chip cache "stack RAM" to compensate for the relatively slow off-chip speed.

Section 7—The Microcode

Most internal language (IL) instructions can be concocted out of some combination of the 27 microcode lines appearing at pins M26-M0, indicated as 38. For example, in one clock cycle, the ASP 30 can:

a) duplicate any of the top three elements from the stack;

b) drop any of the top three elements from the stack;

c) compare two numbers, leaving an all-ones or zero flag on top of the stack to say if either was larger, smaller or they were equal;

d) add, subtract or do any logical operation on the top two elements of the stack.

In two clock cycles (two separate microinstructions) the ASP 30 can:

a) do a double precision add, with 64-bit operands;

b) copy an item from anywhere on the stack to the top of the stack.

It should be noted at this point that the signals appearing at pins M26-M0 represent the microcode and, therefore, are shown and referred to hereinafter and in the drawing figures by a "u" designation as, for example, u26-u0.

The ability to perform a myriad of operations in just one clock cycle (i.e. getting rid of the "overhead" associated with most computers in their implementation of HLLs) is a major attribute of any computer architecture built around the ASP 30 of the present invention. The use of a stack and Reverse Polish might put some designers off, or course, though this is also true of internal language primitives. The lack of registers also means it is easier to realize the full potential of the hardware. The microcode does not stick rigidly to any internal language, though it was optimized by the inventors for procedural languages such as C. Note, however, that it is possible to build two different machines, each employing ASP 30 chips of the present invention as their processors but optimized to run different subsets of the HLL, even when employing the same HLL; that is, employing the ASP approach to a computer architecture it is not only possible, but quite simple, to optimize the execution of the same HLL for different applications requiring different features. This is an important aspect of the present invention not available in any prior art approach to computer architectures.

It should be noted that all the $2^{27}$ possible instructions execute in a single clock cycle, giving the ASP 30 as built and tested a 12.5 MIPS performance figure at 12.5 MHz. But note well that these are HLL instructions, not just machine code operations.

Section 8—Malleable Software and Hardware

When designing a computer system based on the ASP of the present invention, one is free to design both the software and hardware with few limitations. This, of course, could be both a blessing and a bane. The design might initially appear to be a very complex task; however, because of the simplicity of the underlying applications-driven approach, the hardware and compiler designs are greatly simplified.

A simple ASP 30-based computer architecture is shown in FIG. 9. This architecture is, in fact, functionally similar to the virtual machine described in Section 4 and shown in FIG. 4, with the ASP 30 labelled ASP-X and a RAM 84 labelled RAM-X together doing the execution, while the ASP 30 labelled ASP-T and the RAM 84 labelled RAM-T perform the stack frame manipulation. The hardware shown in FIG. 9 represents a minimal high performance system; but, if the application required it, one could easily build a Harvard architecture, use more than two ASPs, add a fast multiplier, or add a floating point accelerator. Always, however, because of its effects of reducing complexity, whether one is changing the hardware or software, the design comes from top down. That is, the ASP-based approach to computer architecture is applications-driven. With the ASP 30 approach of the present invention, a computer designer with a good idea need no longer have to slog through a TTL breadboard or accept the performance limitations of a semi-custom chip design. Instead, using the ASP 30 as the basic building block, he can implement the design without any compromise. The ASP 30 allows the compiler and/or external hardware to be tailored towards a particular language; thus, actually producing the virtual machine for the language. The next few sections will give brief examples of how the inventors envision this can be done.

Section 9—A "C" Machine

The purpose of this section is not to show how to build a C-compiler; but rather, to give a flavor of how efficient the ASP 30 architecture shown in FIG. 9 can do it. Consider the following C statement:

IF(a==0) b=c+d.

An equivalent internal language primitives for this in Reverse Polish as implementable with a ASP 30 architecture might be:

a FETCH 0=IF c FETCH d FETCH +b STORE THEN.

The two statements perform the same task. A compiler would have little trouble going from the original C statement to an internal language. Then, as can be appreciated from the discussion of the last section, one could very efficiently run the resulting internal language program employing the ASP 30-based architecture. Clearly there is room for improvement, even in this simple illustration. For example, the program would be quicker if the variables were stored on the stack instead of FETCHED and STORED.

It must be made clear, however, that such a C-machine is not be just a microprocessor with a C-compiler stuck on. In order to maximize efficiency, one would have to employ a different set of primitives. The choice of primitives would, of course, depend on which parts of the language one wanted to make most efficient.

Section 10—A "Non-Procedural Language Machine"

It is possible to write an optimized compiler for any language (for example Lisp, Small Talk or a DSP language) employing the ASP 30 approach; however, it should be noted that as one moves away from a procedural language, it is no longer sufficient to merely change the primitives. The architecture of the ASP 30 itself will begin to limit the performance. The reasons for this are complex and more work is needed in this area to determine what hardware changes would be necessary. The inventors' approach to this area of interest would be the same as it was in developing the ASP 30 and its chip design: applications-driven, i.e., mapping down from the language to hardware using a profile of typical program primitives. Take for example a DSP program. The compiler could be changed to allow the second stack pointer to step through coefficients without changing the main stack pointer. Additional architecture specifically intended for a DSP-machine might include hardware for performing fast convolution.

Section 11—General Conclusions & Observations

The ASP building block provided by the present invention has some elements of standard microprocessors; but, without their inflexible architecture or relatively slow HLL execution. It is similar to bit-sliced computers; without their complexity. Its design philosophy closely resembles RISC machines; yet, it can execute $2^{27}$ different microinstructions (which a RISC machine by its very nature cannot do) and has virtually no internal registers. The latter makes context switches (for multi-user and multi-tasking applications) much easier. The basic microcode instructions are at a higher level than any microprocessor machine code. In fact, they blur the hardware/software interface, allowing better use of computer system resources. In this regard, however, the inventors do not see the ASP replacing microprocessors. The ASP is more costly and lacks many of a microprocessor's features, such as an on-board memory management unit or cache memory. The inventors' hope is that the ASP is flexible enough to be tailored towards many diverse high performance computing applications, with the power to match or beat the speeds of bit-sliced or TTL designs.

Section 12—Detailed ASP 30 Construction and Operation Details

The following is a detailed description of the features of the ASP chip as constructed and tested by the inventors herein. Its distinctive features are:
32-bit ALU and multiplier;
32-bit multiplexed system address and data bus;
27 independent, non-coded microcode lines;
32-bit stack RAM data bus;
24-bit stack RAM address bus;
124 pin grid array package;
80 ns instruction cycle (with a 12.5 MHz clock);
low power, fully static CMOS technology;
microcode is a high level language, eliminating the need for assembly language.

12.1 GENERAL DESCRIPTION

The ASP 30 is a flexible, high speed 32-bit microprogrammable device. It can perform $2^{27}$ different operations affecting its stack contents such as manipulation, comparison, logic, arithmetic and external memory operations. Microcode (i.e. u26–u0) is loaded via pins M26–M0, with system access via A31–A0. The "stack RAM" is read or written via D31–D0, with the address supplied on pins L23–L0. All data changes on the falling clock (CLK) edge.

As discussed briefly earlier herein, FIG. 6 shows a simplified functional block diagram of the ASP 30, with its two major sub-blocks. The CPU 32 contains an ALU 12', a parallel multiplier and the top two stack registers. The SPU 34 has two stack pointers and two adders; allowing the external "stack RAM" to simulate two stacks. The provision of two stack pointers is an important point of novelty in and of itself. The M-latch 44 delays the external microcode (M) by one clock cycle before it reaches the CPU 32. This pipeline allows the stack address to be recalculated and waiting when the CPU 32 operation begins.

The ASP 30 is designed to form the main computational element(s) in a general purpose computer system. In particular, the architecture has been optimized to run stack-oriented primitives; and, since the virtual machine for most procedural languages, such as C, are stack based, the ASP 30 is principally suited to form the basis of a true high level language (HLL) processor. HLL programs can run on an ASP-implemented system without the normal performance degradation associated within a HLL computer implementation.

12.2 EXTERNAL INTERFACE

The ASP 30 as built and tested is packaged in a 124 pin grid array. Table 1 (earlier herein) describes the function of each pin.

12.3 INSTRUCTION FORMAT

The microcode (M26-M0) can be logically split into two parts: the CPU Field (CF) and the SPU Field (SF). Each field can be further subdivided into a total of 7 subfields as shown in FIG. 10.

12.4 CPU ARCHITECTURE

FIG. 11 shows a simplified block diagram of the CPU 32. It consists of the Arithmetic and Logic Unit (ALU 12'), a parallel multiplier (MLY) 86, the Top of Stack (TOS) and Next on Stack (NOS) registers (DT 46 and DN 48), multiplexers and buffers. Table 2 describes the operation of the two multiplexers MF 88 and ME 90. It should be noted that the multiplier was not implemented in the ASP as built and tested by the inventors herein. The design of the ASP is such that the multiplier (which is preferred for a commercial embodiment) could be added or not with little modification. To include the multiplier, however, would require implementation in 1.2 micron CMOS because of its size.

TABLE 2

MULTIPLEXER TRUTH TABLES

| SELECT | | ME-out | SELECT | | MF-out |
|---|---|---|---|---|---|
| u15 | u14 | X | u13 | u12 | F |
| 0 | 0 | E | 0 | 0 | Y |
| 0 | 1 | J | 0 | 1 | G |
| 1 | 0 | S | 1 | 0 | S |
| 1 | 1 | T | 1 | 1 | T |

12.4.1 Multiplier

MLY 86 is a parallel multiplier, employing a modified Booth's algorithm. Its two 32-bit operands come from TOS and NOS. The least significant 32 bits of the product (G) is fed into the multiplexer MF 88 and, if u13–u12 are set correctly, into NOS. The most significant 32 bits of the result are output in carry-save format, together with a carry (CM), as K and L: i.e., as two 32-bit numbers. These two numbers (and CM) are combined in the ALU 12' and stored in TOS. Thus, the MLY 86 and ALU 12' can multiply NOS by TOS and store the 64-bit result in the same two registers.

The time taken for a multiply is 100 ns, which is longer than a single clock cycle at 20 MHz. Therefore, with a fast clock, the operands must remain in TOS and NOS for one clock cycle before the multiplication proper can begin.

12.4.2 The Arithmetic and Logic Unit

The Arithmetic and Logic Unit (ALU) 12' calculates a 32-bit result (R) from its X and Y (or K and L) operands, under control of the twelve microcode lines (u11-u0). It performs most typical ALU 12' operations such as addition, subtraction, shifting and gating; but, in addition, it can do other powerful operations such as add a wide variety of constants, or output a truth value (all 1's or all 0's) dependent on the result of the current operation.

There are four subfields in the ALU 12' microcode (see Tables 3, 4, 5a and 5b). Each corresponds to a major subsection of the ALU architecture shown in FIG. 12. The first two subfields (selected by u10-u6) determine the left (LO) and right (RO) operands entering the rest of the ALU 12'.

TABLE 3

TRUTH TABLE - LEFT OPERAND

| SELECT LINES | | | LEFT OPERAND |
|---|---|---|---|
| u10 | u9 | u8 | LO |
| 0 | 0 | 0 | Y |
| 0 | 0 | 1 | 0 |
| 0 | 1 | 0 | K |
| 0 | 1 | 1 | Y' |
| 1 | 0 | 0 | 2 |
| 1 | 0 | 1 | 4 |
| 1 | 1 | 0 | −2 |
| 1 | 1 | 1 | −4 |

TABLE 4

TRUTH TABLE - RIGHT OPERAND

| SELECT LINES | | RIGHT OPERAND |
|---|---|---|
| u10 | u9 | RO |
| 0 | 0 | X |
| 0 | 1 | 0 |
| 1 | 0 | L |
| 1 | 1 | X' |

TABLE 5

ALU 12' SELECTION TABLES

| (a) | | | | (b) | | | |
|---|---|---|---|---|---|---|---|
| SELECT LINES | | | OUTPUT | SELECT LINES | | OUTPUT OF MUX'S | |
| u2 | u1 | u0 | RO | U3 | | ML | MM |
| 0 | 0 | 0 | Y | 0 | | 0 | SU32 |
| 0 | 0 | 1 | 0 | 1 | | MS | LS |
| 0 | 1 | 0 | K | | | | |
| 0 | 1 | 1 | Y' | u5 | u4 | | CI |
| 1 | 0 | 0 | 2 | 0 | 0 | | 0 |
| 1 | 0 | 1 | 4 | 0 | 1 | | 1 |
| 1 | 1 | 0 | −2 | 1 | 0 | | CM |
| 1 | 1 | 1 | −4 | 1 | 1 | | MS |

The left (LO) and right (RO) operands are the outputs of the two multiplexers MY 92 and MX 94, respectively. For LO, bits u10-u8 are used to select between eight possible values, as shown in FIG. 10. While for RO, u7-u6 are used to select between four inputs, as shown in Table 4.

The 32-bit outputs from the multiplexers 92, 94, LO and RO, are blocked up to 33 bits by the TWOS logic box. If u11=0 it will sign extend the most significant bits (RO32-RO31 and LO32-LO31). If u11=1, it will either force both the 33rd bits to be zero (RO32=LO32=0), or if a number is being subtracted (determined by u10−u6) set one of the 33rd bits equal to 1. Thus, u11 selects between twos complement (0) and unsigned (1) notation for all arithmetic operations. LO and RO are combined using 32 bit XOR, NAND and NOR gates 98, 100 and 102, respectively. The output of the first two gates 98, 100 (XO and ND) are used, together with the carry in (CI) in the Carry Look-ahead Adder (CLA) 104. The carry (CA) out of the CLA 104 is combined with XO in adder 114 to produce the arithmetic sum, SU. The sign bit, SU32, is also a function of u11-u6. The carry into the CLA 104, C1, from multiplexer MC 112 is either MS, CM (overflow from multiplier), 0 or 1 depending on the values of u5 and u4, as shown in Table 5b. Setting C1 equal to 1 allows odd valued constants to be added. For example, if u10−u8 is "111", u7−u6 is "00", and u5−u4 is "01", the sum, SU, would be X-3 (X-4+C1). (See Tables 3, 4 and 5b.)

During shift operations, multiplexers ML 106 and MM 108 provide the least significant bit or most significant bit, respectively. Table 5b shows how the two values are chosen, using u3 where MS is the carry (SU32) and LS is the least significant bit (SU0) from the previous clock cycle.

The final output of the ALU 12′, R31-R0, from multiplexer MR 116 is determined by u2−u0 as shown in Table 5a. R is either a logical combination of LO31−LO0 and RO31−RO0 (XO, ND, NR), an arithmetic combination of the same (SU), a shifted version of SU (SR or SL with the extra bit from MM or ML), or all R bits are forced equal to ZO or SU32. The latter indicates SU is a negative number (for unsigned arithmetic, this is only true for a subtraction).

The OVF box 110 determines if a numeric overflow (NO) has occurred. It is only set for SU and SL operations (see Table 5). For such operations:
If u11=1 then NO=SU32 XOR SU31.
If u11=0 then NO=SU32.

The NO and ZO flags are latched and are available off-chip as F1 and F0, respectively.

12.5 SPU ARCHITECTURE

FIG. 13 shows a more detailed block diagram of the Stack Pointer Unit (SPU) 34. It consists of the two stack pointer registers (DP 60 and DQ 62), stack limit registers (TT 64 and TB 66), adders (AL 76 and AK 78), comparitors (AT 120 and AB 122) and multiplexers (MH 116 and ML 118). Its operation is controlled by eight bits of the microcode (u26-u19) as described in Tables 6, 7a and 7b.

TABLE 6

| TRUTH TABLE FOR MH OF SPU | | |
|---|---|---|
| SELECT LINES | | OUTPUT |
| u20 | u19 | H |
| 0 | 0 | D |
| 0 | 1 | E |
| 1 | 0 | Q |
| 1 | 1 | P |

TABLE 7

| LOGIC TABLES | | | | | | |
|---|---|---|---|---|---|---|
| (a) RA LOGIC | | | | (b) RV LOGIC | | |
| SELECT LINES | | OUTPUT | | SELECT LINES | | LOAD |
| u26 | u25 | u24 | K | C | u26 | u25 | u24 | REG. |

| u26 | u25 | u24 | K | C | u26 | u25 | u24 | REG. |
|---|---|---|---|---|---|---|---|---|
| 0 | 0 | 0 | H + 1 | H + 0 | 0 | 0 | 0 | 0 |
| 0 | 0 | 1 | H + 1 | H + 1 | 0 | 0 | 1 | 0 |
| 0 | 1 | 0 | H + 1 | H + 2 | 0 | 1 | 0 | 0 |
| 0 | 1 | 1 | H + 1 | H − E | 0 | 1 | 1 | 0 |
| 1 | 0 | 0 | H − 1 | H − 0 | 1 | 0 | 0 | B |
| 1 | 0 | 1 | H − 1 | H − 1 | 1 | 0 | 1 | T |
| 1 | 1 | 0 | H − 1 | H − 2 | 1 | 1 | 0 | Q |
| 1 | 1 | 1 | H − 1 | H − 3 | 1 | 1 | 1 | P |

The value on the E-bus, because of the microcode pipeline, is one from the previous SPU 34 instruction. Data written onto the J-bus (from H) is buffered by DJ 70, so synchronisity is maintained. The value on the H-bus is determined by the 4:1 multiplexer MH 116; controlled by u20 and u19 as shown in Table 6. The value H is used as the base value for the stack RAM address (L) and the pointer registers input (K). The actual values offset by the adders is either determined by u26−u24, via the RA logic, or by the value on the E-bus as shown in Table 7a.

Whether lathes DP 60, DQ 62, TT 64 or TB 66 store new values is determined by u23−u21, via the RV logic, as shown in Table 7b.

Thus, one can simultaneously point with any offset from pointers (DP 60 or DQ 62) and either increment, decrement or leave the pointers unchanged, the only restriction being that both offsets (for K and C) must be in the same direction.

The two comparitors AT 120 and AB 122 output a high, on F2 and F3, when the L value overshoots or undershoots the values stored in TT 64 (t) and TB 66 (b), respectively, (i.e., b is less than L which is less than or equal to t). These two registers must be loaded with the stack limits b and t.

The novel inclusion of two stack pointers enables the simulation of two stacks from a single memory: the P-stack and the Q-stack. Usually, P will be initialized to RAM location O and fill up successively higher locations while Q will be initialized to all 1's and fill up successively lower RAM locations. The external RAM will then function as a stack, through the address supplied on L23−L0 (=C23−C0 delayed one cycle).

With reference to FIG. 11, stack data is written by setting u16 low and read by setting u16 high. Data read on D31−D0 passes through a transparent latch TS 50. TS 50 passes data unhindered when u16 is high (read); but, when u16 goes low, it isolates S and transmits the value corresponding to the value when u16 was last high.

12.6 M-WORD INSTRUCTIONS

We are now in a position to see what type of instructions can be performed by the ASP 30 of the present invention. These instructions are referred to as M-words, and are determined by the value on M26−M0, i.e. the $2^{27}$ possible combinations of u26−u0.

Table 8 sections a to h illustrate some of the possible M-words that have been implemented in the tested embodiment of the ASP 30. The entries in the tables are not exhaustive, to be sure, there being many useful combinations; however, the ones in Table 8 are sufficient to efficiently implement a stack architecture based on a high level language such as C. The example of DUP (duplicate the TOS) will be employed hereinafter to help clarify the stack operation of the M-words in general. A DUP operation requires that TOS be copied into NOS, the old NOS is copied into the next free RAM location and the stack pointer incremented so it continues to point to the next free location.

TABLE 8

| POSSIBLE M-WORD PRIMITIVES | | | | |
|---|---|---|---|---|
| a) STACK MANIPULATION | | | | |
| NOOP | SWASH | DUP | DROP | SWAP |
| OVER | ROT1 | PER1 | NIP | TIP |
| b) P AND Q INTERSTACK COMMUNICATION | | | | |
| QTO | QFROM | QCOPY | | |
| c) COMPARISON OPERATIONS | | | | |
| 0< | 0> | 0= | > | < |
| U> | U< | = | | |
| d) LOGICAL OPERATIONS | | | | |
| AND | OR | XOR | NAND | NOR |
| NOR | XNOR | ANYOP | NOT | |

TABLE 8-continued

| POSSIBLE M-WORD PRIMITIVES | | | | |
|---|---|---|---|---|
| e) ARITHMETIC OPERATIONS | | | | |
| + | − | 1+ | 2+ | 3+ |
| 4+ | 5+ | 1− | 2− | 3− |
| 4− | DAD1 | DAD2 | NEGATE | DNEG1 |
| DNEG2 | MUL | U+ | U− | |
| f) EXTERNAL OPERATIONS | | | | |
| IN | IN4+ | OUT | COUT | OUT4+ |
| INP | INQ | INT | INB | |
| g) CONTROL OPERATIONS | | | | |
| BR | BRZ (F) | BRZ (T) | | |

12.6.1 R-Field

Figure 12:
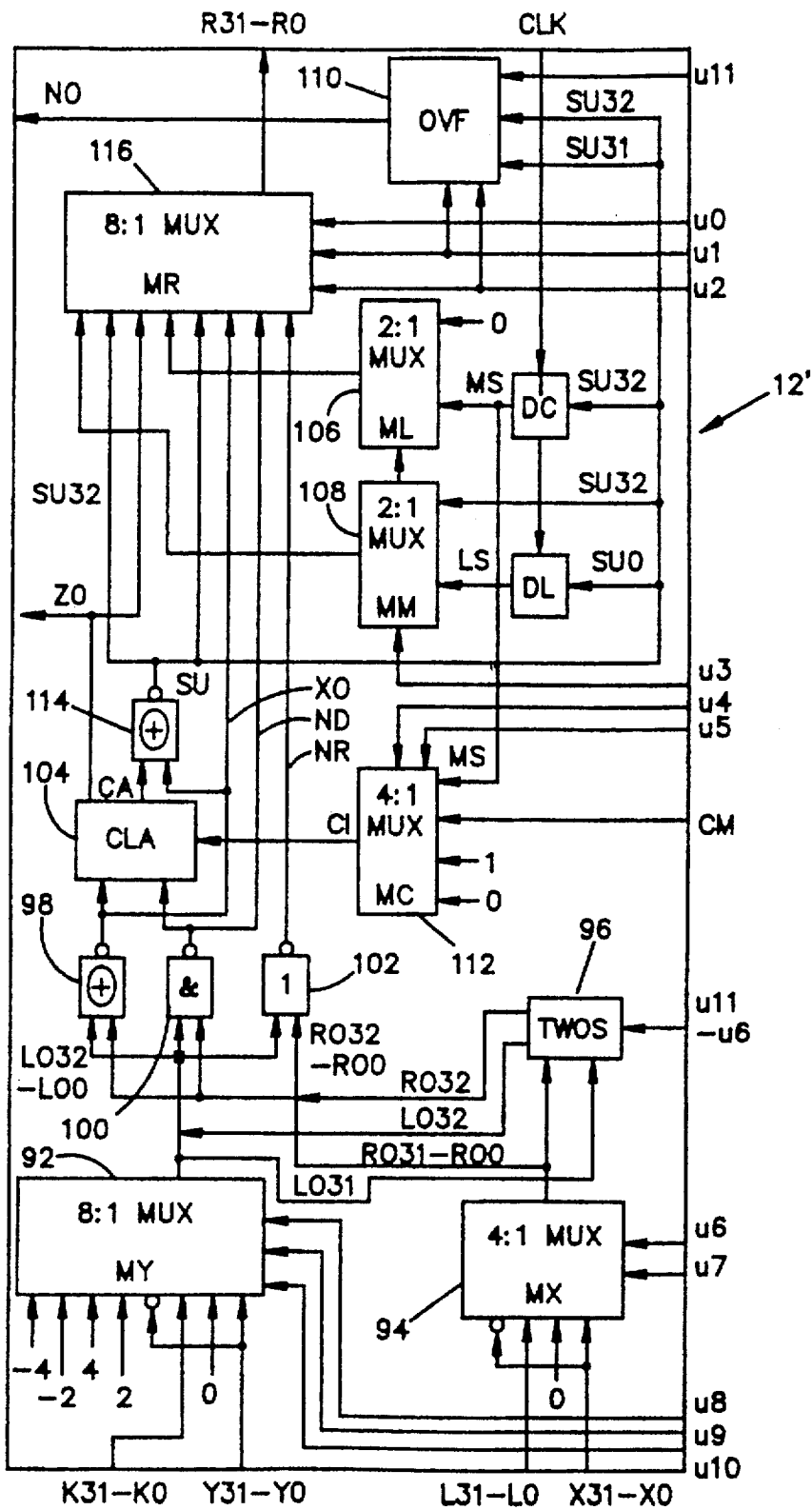
FIG. 12 is detailed block diagram of the ALU portion of the built and tested ASP.

As shown in FIG. 12, bits u11−u0 of the M-word determine what the R-field does. For a DUP, u10−u6 select LO and RO to be 0 and X, respectively, while u2−u0 set R to equal XO. Thus, the net effect of the ALU 12' is to set R=Y.

12.6.2 F-Field

The 4:1 multiplexer MF 88, shown in FIG. 11, selects the input to the NOS via u13 and u12. For DUP, it selects the T input which comes from the TOS. Thus, the new value of NOS will equal the old value of TOS.

12.6.3 X-Field

FIG. 11 shows that bits u15−u14 determine the value on the X-bus, via multiplexer ME 90. For DUP, it sets X equal to T, forcing X to equal the old value of TOS.

12.6.4 A-Field

FIG. 11 shows that bits u18−u16 determine what goes onto the A, D and E buses via the tri-state drivers 56 and transparent latch TS 50. For DUP, it leaves A tri-state, sets D=Y (i.e., writes NOS into the stack RAM) and sets E=T.

12.6.7 P-Field

FIG. 13 shows that bits u20−u19 determine the value of the H-bus. For DUP, it passes the contents of VP, the P stack pointer, to H.

12.6.6 L-Field

FIG. 13 shows that u26−u24 set the values on the L and K buses via AL 76 and AK 78. For DUP, it selects L=H (so the data on the D-bus is written into the next free location) and K=H+1 (so that P continues to address the next free location).

12.6.7 P-Field

FIG. 13 shows that bits u23−u21 determine whether the value on the K-bus is stored in the Q or P latch (i.e. DQ 62, DP 60) and whether H is stored in the DU and DB latches. For DUP, it stores the K, which equals the old P plus one, into DP 60.

12.7 ASP 30 SYSTEM TIMING

Figure 14:
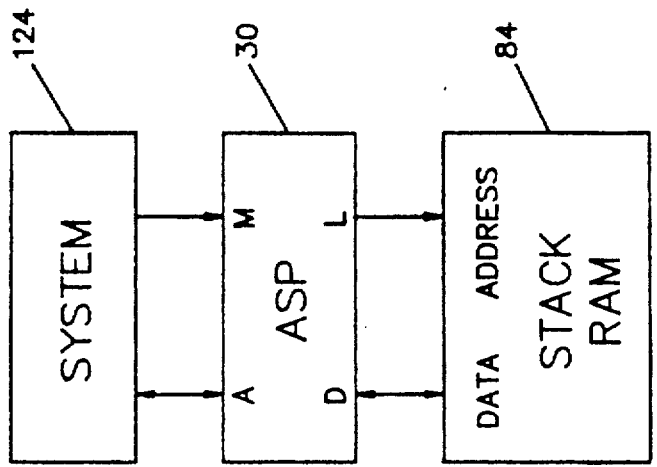
FIG. 14 is a block diagram of the ASP system interface.

FIG. 14 shows the three basic sub-blocks in an ASP system; the ASP 30 itself, the stack RAM 84 and the rest of the system indicated by box 124. An actual computer system capable of executing a HLL would require a minimum of two ASP 30 devices; one for address manipulation (ASP 30-A), and one for data manipulation (ASP 30-D). The two ASP 30-chip system would contain a total of four stacks—the two data stacks (P-stack and Q-stack) and the two address stacks (R-stack and S-stack). The two extra stacks, Q and S, made possible by the extra register in the SPU 34 of the ASP 30, allow extra flexibility in system design. Typical uses would be for loop counting, floating point numbers, and HLLs requiring more than two stacks (e.g., LISP and Small Talk).

FIG. 15 illustrates the pipelined nature of the ASP 30. When a microcode word (say DUP) is put onto M, the SPU 34 immediately starts its calculations. That is, C=P (next free stack RAM location) and P=P+1 (so the stack pointer continues to point to the next free location for the next instruction). At this time, the CPU 32 and stack RAM 84 will still be doing the previous instruction.

During the next cycle, when a new M-word is placed on M, the address calculated by the SPU 34 (and stored in DL 68) will be put onto the L-bus. Also, the SPU 34 will execute the DUP operation (TOS=NOS=old TOS and COS=next free RAM location=old NOS). By having the stack address calculated in the previous cycle, it does not form part of the critical timing path, which, in turn, determines the maximum clock frequency.

Wherefore, having thus described the present invention, what is claimed is:

1. An Arithmetic Stack Processor (ASP) module for use in building high level language computers combining in a single chip:
   a) a microprogrammable Central Processing Unit (CPU) having a plurality of code input means for sequentially loading microcode to be executed by said CPU from a source supplying the microcode, a plurality of input/output pin means for acting as a port for external data transfers to and from said CPU, a plurality of RAM pin means for reading from and writing to a stack random access memory (RAM) external to the ASP;
   b) a Stack Pointer Unit (SPU) having a plurality of code input means for receiving the microcode supplied from said source and a plurality of RAM address pin means for designating addresses of said external stack RAM to be written into and read from by said CPU and a plurality of stack pointer registers for containing stack pointers to locations in said external stack RAM, said SPU comprising means for calculating from said microcode a sequence of next addresses in said external stack RAM;
   c) delay means, coupled to said CPU, for receiving said microcode supplied from said source concurrently with said SPU, delaying delivery of said received microcode to said CPU one clock cycle thereby allowing said SPU to calculate from said received microcode a sequence of next addresses in said external stack RAM one clock cycle before said CPU needs to read or write the data corresponding to each said next address; and,
   d) clock buffer means for receiving a clock signal from a source supplying the clock at an input thereof and for transmitting said clock signal to said CPU, said SPU and said delay means.

2. The ASP of claim 1 wherein said delay means comprises:
   a) latch means for receiving microcode simultaneously with said SPU and for delaying said microcode one cycle of said clock signal before it reaches said CPU; and
   b) means for allowing said SPU to add the contents from one of its said stack pointers to any address offset required and latch the result onto an L-bus latch connected to said plurality of RAM address pin means during said one clock cycle whereby said CPU is allowed to read or write from said stack RAM external to the ASP with an associated address for the read or write already waiting on said L-bus latch.

3. The ASP of claim 1 wherein said CPU comprises:
a) an arithmetic and logic unit (ALU);
b) a pair of top two stack position registers (DT and DN);
c) a transparent latch (TS);
d) a pair of one-bit flag registers (DO and DZ);
e) a plurality of tri-state buffers; and,
f) multiplexer means for interconnecting said foregoing components and for connecting said foregoing components to said code input pin means and said input/output pin means.

4. The ASP of claim 1 wherein said SPU comprises:
a) a pair of stack pointer registers (DP and DQ);
b) a pair of stack limit registers (TT and TB);
c) a pair of buffers (DL and DJ);
d) a pair of flag registers (DT and DB);
e) a pair of adders (AL and AK);
f) a first comparitor acting as an underflow detector and a second comparitor acting as an overflow detector; and,
g) multiplexer means for interconnecting said foregoing components and for connecting said foregoing components to said RAM address pin means and said CPU.

5. The ASP of claim 1 wherein said SPU includes: a pair of stack pointer register means each for temporarily and changably holding the address of a stack in a memory whereby two stacks can be implemented by said SPU in a single shared memory.

6. A simple ASP-based high level language implementing computer architecture comprising:
a) first random access memory (RAM) stack memory means for holding stacked execution data;
b) second random access memory (RAM) stack memory means for holding stack frame manipulation data;
c) main volatile memory for holding system program instruction sequences and data;
d) a first ASP unit connected to perform arithmetic and stack processing operations on said first RAM stack memory means;
e) a second ASP unit connected to perform arithmetic and stack processing operations on said second RAM stack memory means, said first and second ASP units each comprising,
   e1) a microprogrammable Central Processing Unit (CPU) having a plurality of code input pin means for sequentially loading microcode to be executed by said CPU, a plurality of input/output pin means for acting as a port for external data transfer to and from said CPU, a plurality of RAM pin means for reading from and writing to a respective stack random access memory (RAM);
   e2) a Stack Pointer Unit (SPU) having a plurality of code input means for receiving the microcode supplied from said source and a plurality of RAM address pin means for designating addresses of said respective one RAM stack memory means to be written into and read from by said CPU and a plurality of stack pointer registers for containing stack pointers to locations in said respective one stack RAM memory means;
   e3) delay means, coupled to said CPU, for receiving microcode supplied from said source concurrently with said SPU, delaying delivery of said received microcode to said CPU one clock cycle thereby allowing said SPU to calculate from said microcode a sequence of next addresses in said respective one RAM stack memory means one clock cycle before said CPU needs to read or write the data corresponding to each said next address; and,
   e4) clock buffer means for receiving a clock signal from a source supplying the clock signal at an input thereof and for transmitting said clock signal to said CPU, said SPU and said delay means; and
f) sequencer means operably connected to said main volatile memory, said first ASP unit and said second ASP unit for controlling the execution of system program instruction sequences by said first and second ASP units.

7. The computer architecture of claim 6 wherein each said delay means comprises:
a) latch means for receiving microcode simultaneously with said SPU and for delaying said microcode one cycle of said clock signal before it reaches said CPU; and,
b) means for allowing said SPU to add the contents from one of its said stack pointers to any address offset required and latch the result onto an L-bus latch connected to said plurality of RAM address latch pin means during said one clock cycle whereby said CPU is allowed to read or write from said external stack RAM with an associated address for the read or write already waiting on said L-bus latch.

8. The computer architecture of claim 6 wherein each said CPU comprises:
a) an arithmetic and logic unit (ALU);
b) a pair of top two stack position registers (DT and DN);
c) a transparent latch (TS);
d) a pair of one-bit flag registers (DO and DZ);
e) a plurality of tri-state buffers; and,
f) multiplexer means for interconnecting said foregoing components and for connecting said foregoing components to said code input pin means and said input/output pin means.

9. The computer architecture of claim 6 wherein each said SPU comprises:
a) a pair of stack pointer registers (DP and DQ);
b) a pair of stack limit registers (TT and TB);
c) a pair of buffers (DL and DJ);
d) a pair of flag registers (DT and DB);
e) a pair of adders (AL and AK);
f) a first comparitor acting as an underflow detector and a second comparitor acting as an overflow detector; and,
g) multiplexer means for interconnecting said foregoing components and for connecting said foregoing components to said RAM address pin means and said CPU.

10. The computer architecture of claim 6 wherein each said SPU includes:
a pair of stack pointer register means each for temporarily and changably holding the address of stack in a memory whereby two stacks can be implemented by said SPU in a single shared memory.

11. An Arithmetic Stack Processor (ASP) logic chip for use in the building of high level computers comprising:
a) A microprogrammable Central Processing Unit (CPU) portion having a plurality of code input means for sequentially loading microcode to be executed by said CPU portion from a source supplying the microcode, a plurality of output means for acting as a port for external data transfers from said CPU portions, a plurality of RAM interface means for reading from and writing to a stack random access memory (RAM) external to the ASP;

b) a Stack Pointer Unit (SPU) portion having a plurality of code input means for receiving the microcode supplied from said source and having a plurality of RAM address means for designating addresses of said external stack RAM to be written into and read from by said CPU portion and a pair of stack pointer means for containing pointers to the locations of two stacks in said external stack RAM, said SPU comprising means for calculating from said microcode a sequence of next addresses in said external stack RAM;

c) delay means coupled to said CPU, for receiving said microcode supplied from said source concurrently with said SPU, delaying delivery of said received microcode to said CPU one clock cycle thereby allowing said SPU portion to calculate from said received microcode a sequence of next addresses in said external stack RAM one clock cycle before said CPU portion needs to read or write the data corresponding to each said next address; and, d) clock buffer means for receiving a clock signal from a source supplying the clock signal at an input thereof and for transmitting said clock signal to said CPU portion, said SPU portion and said delay means.

12. The ASP of claim 11 wherein said delay means comprises:

a) latch means for receiving microcode simultaneously with said SPU portion and for delaying said microcode one cycle of said clock signal before it reaches said CPU portion; and, b) means for allowing said SPU portion to add the contents from one of its said stack pointers to any address offset required and latch the result onto an L-bus latch connected to said plurality of RAM address means during said one clock cycle whereby said CPU portion is allowed to read or write from said external stack RAM with an associated address for the read or write already waiting on said L-bus latch.

13. The ASP of claim 11 wherein said CPU portion comprises:

a) an arithmetic and logic unit (ALU);
b) a pair of top two stack position registers (DT and DN);
c) a transparent latch (TS);
d) a pair of one-bit flag registers (DO and DZ);
e) a plurality of tri-state buffers; and,
f) multiplexer means for interconnecting said foregoing components and for connecting said foregoing components to said code input means and said output means.

14. The ASP of claim 11 wherein said SPU portion comprises:

a) a pair of stack pointer registers (DP and DQ);
b) a pair of stack limit registers (TT and TB);
c) a pair of buffers (DL and DJ);
d) a pair of flag registers (DT and DB);
e) a pair of adders (AL and AK);
f) a pair of comparitors acting as underflow and overflow detectors, respectively; and,
g) multiplexer means for interconnecting said foregoing components and for connecting said foregoing components to said RAM address means and said CPU portion.

* * * * *